Sept. 20, 1932. I. KITROSER 1,878,857
COLOR FILTER
Filed Dec. 15, 1930
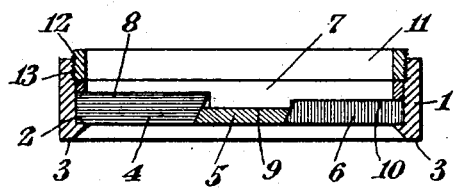
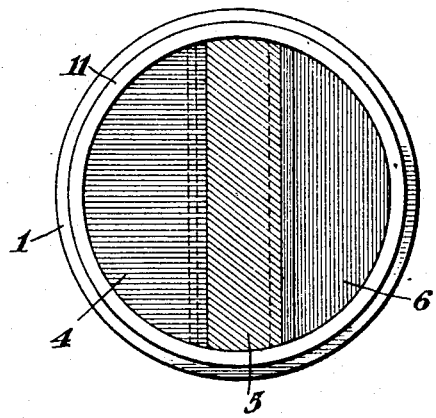
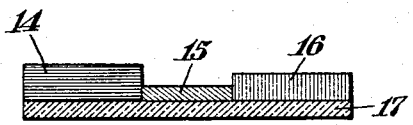
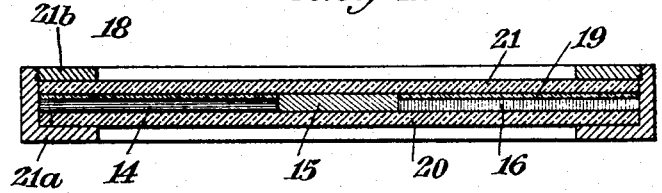
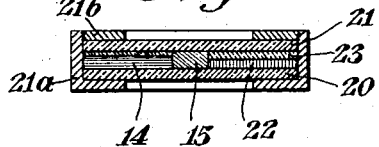
INVENTOR
Isaac Kitroser
BY his ATTORNEY
Arthur Wright Patented Sept. 20, 1932

1,878,857

UNITED STATES PATENT OFFICE

ISAAC KITROSER, OF PARIS, FRANCE, ASSIGNOR TO KELLER-DORIAN COLORFILM CORPORATION, OF NEW YORK, N. Y., A CORPORATION OF DELAWARE

COLOR FILTER

Application filed December 15, 1930. Serial No. 502,274.

My invention relates particularly to an apparatus adapted for use in photography or cinematography, comprising a color filter, and which is adapted to be used in any desired part of the cinematographic apparatus, as for instance, in taking or projecting pictures in connection with lenticular films.

In the taking and in the projection of pictures in colors in connection with cinematographic films, using lenticular or goffered films, that is to say films having sensitive emulsion carried by a support and having one face of the support provided with a large number of minute lenticular surfaces which may be approximately spherical or cylindrical in arrangement, the latter either being transverse or longitudinal of the strip of film, it is customary to utilize a color filter associated with the objective or other part of the apparatus, said filter having a plurality of bands of colors, as for instance, red, green and blue, which are interposed in the light rays. In taking pictures in this way the color filter separates out the rays of different colors so as to produce on the film an infinite number of images of the color filter divided into the bands of color contained in the filter. In projecting the picture from the film thus exposed and carrying the images of the color filter, the rays of light follow the reverse course and become blended from a cinematographic film in such a manner as to reproduce on the screen the natural colors of the object or scene originally photographed. This is known as the Keller-Dorian process of color photography. It has been the custom to construct such color filters with a transparent material, as for instance, gelatine, the gelatine carrying in the body of the same a coloring material to produce the desired color bands in the three colors referred to. It has been found, however, that the color filters so constructed are not only easily damaged but that under the intense heat to which they are at times subjected in the projection of pictures, the gelatine will shrink and warp and separate at the adjacent edges of the three colored plates of gelatine. This results in letting through white light between the edges of the adjacent gelatine plates which diminishes the relative intensities of the different colors and, in effect, makes the projection in colors so pale as to change, in a marked way, the tones and shades of the different colors thus projected on the screen. Again, the continued use of the color filters made in this way results in the alteration of the colors in the color bands due to the darkening or lessening of the transparency thereof. Furthermore, in a case where the light is allowed to pass for too long an interval through the color filter in projecting pictures therewith, the intensity of the light has at times resulted in melting and destroying the filter.

Furthermore, the light always had the tendency of altering the organic coloring material used in producing the plates of the different color bands and certain colors were thus lacking in stability, as for example, the blue color, inasmuch as the blue, after some hours of exposure, commences to allow the passage of red rays. Again, gelatine easily absorbs the humidity from the air and, accordingly, it was difficult to preserve the color filters. Attempts were made to protect the color filters from the humidity of the air. The gelatine plates, to prevent the absorption of moisture from the air, were coated at the edges with a layer of paraffin in order to avoid the effects of warping of the color filters, but this did not result in perfectly centering the screen in relation to the diaphragm, owing to the variation and softness of the paraffin layer.

In order to avoid these disadvantages I have constructed a screen, made in accordance with my invention, from colored glass and in the present application I have provided a construction which enables screens to be made in this way. For this purpose it is desirable to employ glass which is colored throughout the body thereof and not on the surface inasmuch as the surface-colored glass is not uniform in a single piece, nor is it manufactured with a color that is uniform and can be relied upon from time to time in different lots of the colored glass. Furthermore, such surface-colored glass is not constant as to its spectral absorption of light and the layer of silicate or borate carrying the color on the surface of the glass is not perfectly uniform in thickness, so that changes in the tints occur in the different portions of a body of such glass. On the other hand, glass which has been given a color throughout the body thereof is available, having a definite curve of spectral absorption.

In accordance with my invention, when the screen is used with parallel light, each band of colored glass is surfaced and polished so as to allow each color band of glass of the different colors to have a different thickness, so as to pass through the same a predetermined portion of the colored light desired. In other words, it will be understood that any colored glass, at least in thin layers, will pass some other rays than the color desired and that the thicker the layer of glass the smaller is the percentage of such other rays passed therethrough. In accordance with my invention the different plates of glass of the three different colors are preferably ground to such a thickness that each will allow the same percentage of its particular color to pass as the percentage of the other two colors allowed to pass on the other two colored plates, respectively. However, in the case of the color filters used in taking pictures, this thickness is modified somewhat to compensate for the difference in sensitiveness of the sensitive emulsion of the three colors desired. Also, as where the plates are not cemented together, preferably the edges of the colored plates are beveled so that the neighboring plates of colored glass fit together easily and do not allow white light to pass through the same. The colored plates of glass may then be mounted in any desired way as these colored plates may be held in place with a retaining ring or cemented, as hereinafter described. Where convergent light or divergent light is intended to be passed through the color filter it is desirable that the outer faces of the color filter be parallel and, accordingly, additional plates of transparent glass are preferably added, as hereinafter described for that purpose.

While my invention is capable of embodiment in many different forms, by way of illustration I have shown only certain forms of the same in the accompanying drawing, in which—

Fig. 1 is a transverse section of a color filter made in accordance with my invention, designed to be used with parallel light;

Fig. 2 is a plan view of the same;

Fig. 3 is a transverse section of a modified form of my invention for use with parallel light;

Fig. 4 is a transverse section of a modified form of my invention, designed to be used with divergent or convergent light in a projecting machine; and Fig. 5 is a modified form of the invention as shown in Fig. 4, but as adapted for taking pictures.

In the drawing, referring first to Figs. 1 and 2, I have shown a construction in which there is a ring 1 having a retaining flange 2, with a beveled outer face 3, for supporting in place a plurality of, as for instance three, glass plates 4, 5 and 6, carrying throughout the body of the same, respectively, any desired different colors, as for example, blue, green and red. It will be noted that the blue glass plate 4, the green glass plate 5 and the red glass plate 6 have different thicknesses. The respective plates of glass are ground and polished to these thicknesses in order that each of said plates 4, 5 and 6 will pass therethrough substantially the same percentage of the desired single color as the percentage of the respective single colors passed by the other two plates. It will be noted that for this purpose, when the color filter is used in projection, according to the particular glasses used, the green plate may be the thickest and the blue and the red plates may be thinner, as shown in Fig. 4, or they may be of other thicknesses as in Fig. 1. However, it will be understood that where the filter is to be used in taking pictures, as in the camera, according to the particular glasses used, the blue plate will be thicker than the red plate and the green plate the thickest, as in Fig. 5, due to the fact that the sensitive emulsion is more sensitive to certain rays than others or they may have other thicknesses. It will be understood that these constructions given above concerning the light passed by the respective colored glass plates 4, 5 and 6, is with regard to equal unit areas of the three colored glass plates and that preferably the areas of the three colored plates 4, 5 and 6, exposed to the light, are substantially equal one to another. Furthermore, it will be understood that the colors blue, green and red so chosen for the several colored plates 4, 5 and 6 are such, when blended as to give white light on projection in reproducing a white light from an object photographed. It is to be understood, furthermore, however, that, if desired, which ever plate occupies the center of the color filter, may have a somewhat smaller area than would otherwise be the case, to compensate for the fact that the light which falls perpendicularly on the lenticles of a lenticular film will pass a larger percentage of the light into the lenticles than where the light strikes the lenticles at an angle thereto. Preferably, it will be understood that the color filters made in accordance with my invention are used in connection with cinematographic films having cylindrical goffering extending crosswise of the film and parallel to the three color bands of the color filter, although it is to be understood that the goffering of the film may be of any other character, as for example, longitudinally arranged lenticular gofferings in which event the color bands of the filter would be parallel to the lenticular gofferings, that is to say, parallel to the edges of the film. While the material of which the colored glass plates 4, 5 and 6 are made is preferably glass, it will be understood, also, I may use other materials therefor, as for example, quartz, etc., or any other hard transparent material. Likewise, it will be understood that while the color bands 4, 5 and 6 have been shown as parallel, the color areas may be made in any other desired shape or divided up in any other suitable way.

In the form of my invention as shown in Fig. 1 the three colored plates 4, 5 and 6 of different thicknesses are provided with beveled edges to prevent the passage of white light between the plates due to expansion and contraction under the influence of heat and light to which the apparatus is subjected in use. Furthermore, these colored plates 4, 5 and 6 are retained in place by a retaining ring 7 which has retaining surfaces 8, 9 and 10 to accord with and fit against the edges of the colored glass plates 4, 5 and 6, respectively. This retaining ring 7 is in turn held in place by a ring 11 which has a screw-thread 12 fitting into a screw-thread 13 on the interior ring 1.

In the form of my invention shown in Fig. 3, I have provided blue, green and red glass plates 14, 15 and 16, constructed the same as the plates 4, 5 and 6 except that the adjacent edges thereof are arranged at right angles to the surfaces of the plates, and except that the plates 14, 15 and 16 are cemented with Canada balsam to a circular transparent colorless glass plate 17. This construction is also adapted for use with parallel light and it will be understood that as so constructed the plates just referred to may be carried in any desired type of mounting.

In Fig. 4 I have shown a construction adapted for use with convergent or divergent or even parallel light which is similar to that shown in Fig. 3 except that in addition there is cemented in place a transparent colorless glass plate 18 to fill up the circular area above the blue plate to the level of the green plate 15, and that there is a transparent colorless glass plate 19 cemented above the red plate 16 to fill up the circular area above the plate 16, also to the same level, and except that, preferably, adjacent to the outer faces of the plates 14, 15 and 16 there is provided a transparent circular glass plate 20 cemented to the plates 14, 15 and 16. On the other face there is cemented in place a transparent circular glass plate 21. It is to be understood, however, that, if desired, either or both of the plates 20 and 21 may be omitted. Also, there is provided a mounting 21a for the same having a retaining ring 21b screw-threaded thereto.

In the form of my invention shown in Fig. 5, this construction may be adapted for taking pictures, that is to say, for insertion in a cinematographic camera. In this instance, the construction of the color filter may be the same as any of those described above, as for instance, the construction shown in Fig. 4, but by providing instead a red glass plate 22 which is thinner than the blue and green plates 14 and 15, and by providing a thicker compensating transparent colorless glass plate 23 somewhat thicker than the plate 19 shown in Fig. 4 to compensate proportionately for the thinness of the red glass plate 22.

For instance, an example of a projection color filter, as shown in Fig. 4, would be comprised of the outer glass plates 20 and 21 having a total diameter of 60 mm. and an exposed diameter of 48 mm., having a center green plate of 12 mm. width, the blue plate 14 being made of Corning glass GS4H blue of a thickness ½ mm., the green plate 15 being made of Corning glass G401-CZ Sextant green having a thickness of 1.8 mm., and the red glass plate 16 being made of Corning glass G24 red, having a thickness of ½ mm. As an example of the color screen as used in the cineamatographic camera, and which is shown in Fig. 5, I may make the screen with outer glass plates 21 and 20 having a diameter of 21 mm., and an area of 13 mm. in diameter exposed to the light, the width of the green plate 15 being 3.5 mm. In this instance I may use a blue plate 14 made of Schott (Jena) glass 8780 having a thickness of ½ mm., the green plate 15 being made of Corning glass G401-CZ, having a thickness of 1.5 mm., and the red glass plate 22 being made of Corning glass G24 red having a thickness of 0.8 mm.

While I have described my invention above in detail I wish it to be understood that many changes may be made therein without departing from the spirit of the same.

I claim:

1. A color filter adapted for use with lenticular films comprising a plurality of transparent plates made of hard material unaffected by light, having different colors and different thicknesses and protecting plates of transparent material located on the opposite sides of the color plates.

2. A color filter adapted for use with lenticular films comprising a plurality of transparent glass plates having different colors and different thicknesses and a protecting plate of transparent material located on the outer face of the color plates.

3. A color filter adapted for use with lenticular films comprising a plurality of transparent glass plates having different colors and different thicknesses, the colors being distributed throughout the body of each glass plate, and protecting plates of transparent material located on the opposite sides of the color plates.

4. A color filter adapted for use with lenticular films comprising a plurality of transparent glass plates of different colors, having different thicknesses.

5. A color filter adapted for use with lenticular films comprising a plurality of transparent glass plates of different colors, having different thicknesses, the respective glass plates being adapted to transmit the same percentage of light in the form of its particular color as is transmitted by the other plates.

6. A color filter adapted for use with lenticular films comprising a plurality of transparent glass plates of different colors, having different thicknesses, the respective glass plates being adapted to transmit the same percentage of light in the form of its particular color as is transmitted by the other plates, the said percentage being varied somewhat to compensate for the sensitiveness of the photographic emulsion.

7. A color filter adapted for use with lenticular films comprising a plurality of transparent glass plates of different colors having different thicknesses and transparent compensating plates adjacent to the colored plates to provide a uniform thickness for the filter.

8. A color filter adapted for use with lenticular films comprising a plurality of transparent glass plates of different colors having different thicknesses, the respective plates being adapted to transmit the same percentage of light in the form of its particular color as is transmitted by the other plates, the said percentage being varied somewhat to compensate for the sensitiveness of the photographic emulsion, and a protecting transparent glass plate on the face of the colored plates.

9. A color filter adapted for use with lenticular films comprising a plurality of transparent glass plates of different colors having different thicknesses, transparent compensating plates adjacent to the colored plates to provide a uniform thickness for the filter and a protecting transparent glass plate on the face of the colored plates.

10. A color filter adapted for use with lenticular films comprising a plurality of transparent glass plates of different colors, having different thicknesses, a supporting ring for said plates and an interfitting retaining ring having thicknesses compensating for the thicknesses of the glass plates.

ISAAC KITROSER.